W. C. PYPES.
METHOD OF OVERHAULING MEATS DURING CURING.
APPLICATION FILED FEB. 4, 1910.
987,488.
Patented Mar. 21, 1911.
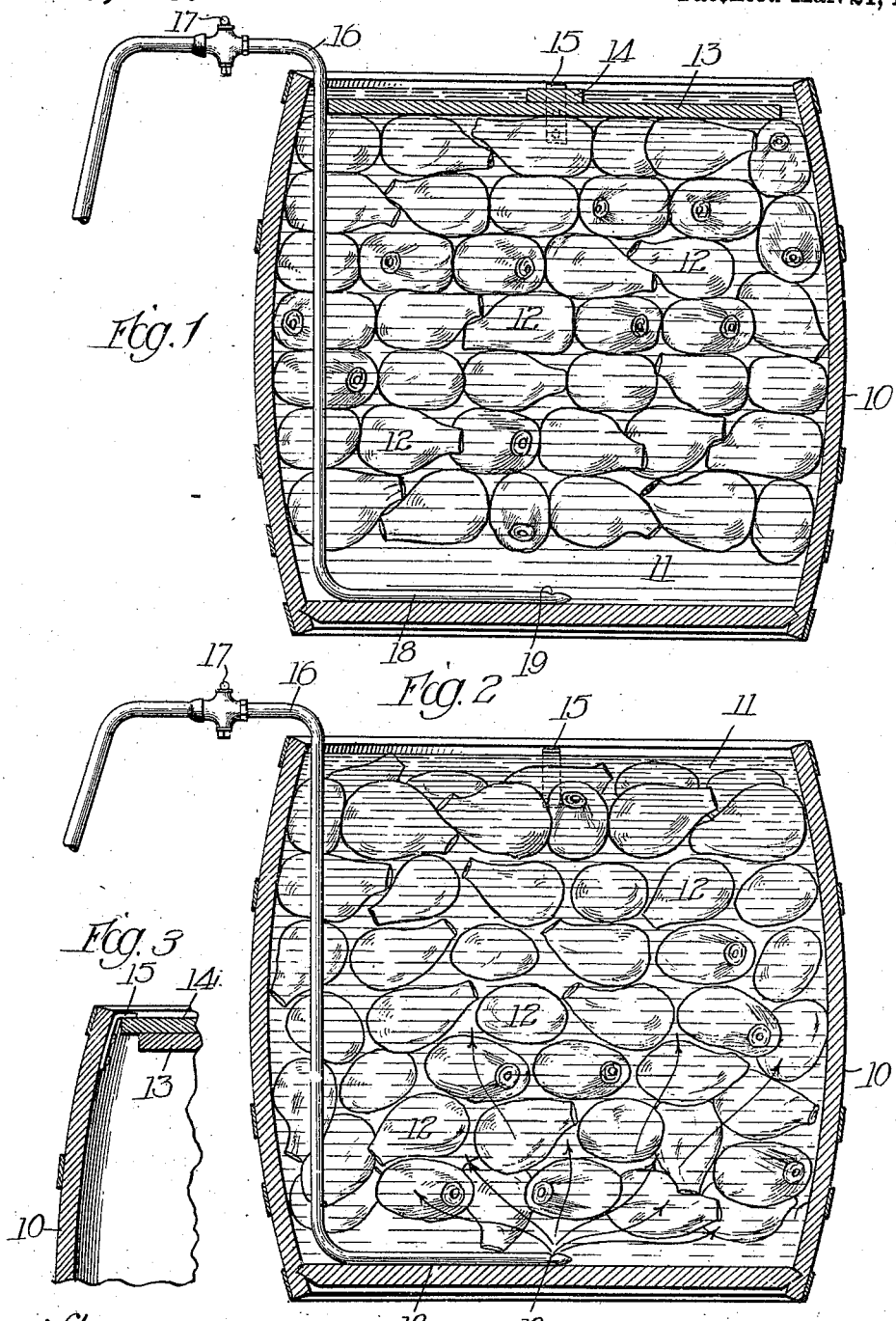

UNITED STATES PATENT OFFICE.

WILLIAM C. PYPES, OF KANSAS CITY, MISSOURI, ASSIGNOR TO ARMOUR & COMPANY, OF CHICAGO, ILLINOIS, A CORPORATION OF ILLINOIS.

METHOD OF OVERHAULING MEATS DURING CURING.

987,488.

Specification of Letters Patent.   Patented Mar. 21, 1911.

Application filed February 4, 1910.   Serial No. 542,006.

*To all whom it may concern:*

Be it known that I, WILLIAM C. PYPES, a citizen of the United States, residing at Kansas City, in the county of Jackson and State of Missouri, have invented certain new and useful Improvements in Methods of Overhauling Meats During Curing, of which the following is a specification.

In the curing of meat, hams for example, the pieces of meat are packed into a solution with curing properties, such solution being ordinarily composed of water, salt and sugar. If such hams are allowed to rest upon or contact with one another during the entire time or period of curing without changing their positions, these portions of the hams in contact with one another will not be properly cured because the liquid or solution does not have proper access thereto. It has therefore heretofore been customary to change the positions of the pieces of meat or hams so as to vary their point of contact, and thereby secure substantially uniform curing throughout. This may be done by removing the hams or other pieces of meat from one receptacle to another, so that as these pieces settle they will assume different positions from those which they previously occupied, and will expose to the action of the curing liquid those portions or parts thereof previously unsubjected to the curing process. This handling of the meats or hams is more or less troublesome and expensive, and the present invention involves a method of overhauling or redistributing such pieces of meat or hams to effect the desired result indicated. The brine or curing solution is ordinarily of sufficient specific gravity to cause the floating of the meats cured therein, the latter being held down in the solution by any proper or suitable means, and this invention involves the introduction of a fluid, preferably, though not necessarily, gas under pressure, into the curing liquid beneath the hams or other pieces of meat, so that as this fluid passes upwardly it assists in floating and turning the hams, whereby upon their settling they assume new positions or relations, exposing their uncured parts or surfaces to the action of the brine.

In the accompanying drawings, I have illustrated the carrying out of this improved method, and in these drawings,—Figure 1 shows the positions of the hams in the tank or cask during curing; Fig. 2 indicates the release of compressed air in the lower portion of the cask, and shows the hams floating and turning, ready to settle in new positions; and Fig. 3 is a sectional detail, showing the means for holding the cover or ham retainer in position.

By reference to this drawing, it will be noted that in the carrying out of this improved process or method, a tank, cask or other container 10 is substantially filled with a curing liquid 11, which in the case of the curing of hams is ordinarily composed of water, salt and sugar. Into this liquid the hams 12 or other pieces of meat are introduced, the brine being ordinarily of sufficient specific gravity or density to cause a floating of these hams, and in order to retain all of them beneath the top surface of the liquid, I employ a cover 13 having a top cross bar 14, the ends of which are held beneath the inturned ears of suitable brackets 15 fastened to the inside of the cask at the top edge thereof. A pipe 16 having a quick-acting valve 17 extends downwardly between the hams to the bottom of the cask, where it is supplied with an inwardly extended end 18 reaching substantially to the middle of the bottom, being apertured on the top at 19 at this point.

When it is desired to overhaul or redistribute the hams to effect the uniform and satisfactory curing thereof, the top 13 is removed, permitting the hams to float, and a succession of discharges or blasts of compressed air is permitted to escape through the opening 19, as shown in Fig. 2, by reason of the proper manipulation of the valve 17. The escaping compressed air suddenly expands, and in its upward travel acts to dislodge, turn and agitate the hams in the manner indicated in Fig. 2, and as soon as the series of blasts is discontinued, the hams are again pressed down into the liquid by the introduction of the cover 13, all of the hams assuming new positions and new points of contact. In this way an efficient and effective curing of the meat is obtained, and at very slight expense in carrying out the overhauling or redistributing operation indicated. It will be understood that this introduction of compressed air not only stirs up the pieces of meat, but also renders the solution more uniform in density. Those acquainted with this line of industry understand that the portions of the solution covering the pieces of meat become reduced in specific gravity owing to the absorption of the salts in solution by the meat, and consequently such overhauling of the meat and stirring of the solution brings about a more uniform density of the curing liquid. Furthermore, the introduction of the oxygen of such compressed air, aerates the solution and assists in its purification by the oxygenation of its impurities, permitting such solution to remain longer in a usable condition than has heretofore been possible.

Although I have mentioned the use of compressed air for the carrying out of this method, it is to be understood that liquids may be employed, if desired, or gases used in place of such air, and as examples I may mention the employment of oxygen or of ozonized air. Compressed air, however, acts satisfactorily, and is ordinarily readily accessible in a packing establishment.

It is to be understood that no special style or form of apparatus is necessary in the performance of this improved method of overhauling or agitating meats, and although I have indicated that the escape or discharge of a series of blasts of the compressed air is desirable, it is possible to satisfactorily carry on this process by using only a single discharge of such air.

Many minor changes may be made in the method or process herein set forth without departing from the heart of the invention and without the sacrifice of any of its benefits and advantages, and it is therefore to be understood that the invention is not limited and restricted to the exact and precise details mentioned above.

I claim:

1. The method of overhauling meats during curing in a liquid open to the atmosphere, which consists in discharging a fluid under pressure into the liquid beneath the pieces of meat, whereby during the upward travel of said fluid through the liquid to bring about the overhauling and redistribution of the pieces of meat and to secure purification of the liquid, said fluid escaping at once into the atmosphere, substantially as described.

2. The method of overhauling meats during curing in a liquid open to the atmosphere, which consists in intermittently discharging a fluid containing oxygen under pressure into the liquid beneath the pieces of meat, whereby during the upward travel of the fluid through the liquid to bring about the overhauling and redistribution of the pieces of meat and to secure purification of the liquid, such fluid escaping at once from the liquid into the atmosphere, substantially as described.

3. The method of overhauling meats during curing in a liquid open to the atmosphere, which consists in intermittently discharging compressed air into the liquid beneath the pieces of meat, whereby during the passage of such air upwardly through the liquid to bring about the overhauling and redistribution of the pieces of meat and to secure purification of the liquid, such compressed air escaping at once into the atmosphere, substantially as described.

WILLIAM C. PYPES.

Witnesses:
A. E. PURSEL,
H. C. ALLEN.

---

Copies of this patent may be obtained for five cents each, by addressing the "Commissioner of Patents, Washington, D. C."